United States Patent [19]
Barcza et al.

[11] Patent Number: 5,011,080
[45] Date of Patent: Apr. 30, 1991

[54] CONVERGENT/DIVERGENT NOZZLE CONSTRUCTION

[75] Inventors: William K. Barcza; Curtis W. Berger, both of Stuart; Luke A. Hmiel, Jupiter, all of Fla.

[73] Assignee: United Technologies Corporation, Hartford, Conn.

[21] Appl. No.: 510,755

[22] Filed: Apr. 18, 1990

[51] Int. Cl.$^5$ .............................................. F02K 1/08
[52] U.S. Cl. .......................... 239/265.39; 239/265.19
[58] Field of Search ...................... 239/265.19, 265.33, 239/265.37, 265.39, 265.41; 60/271, 39.32

[56] References Cited

U.S. PATENT DOCUMENTS

| | | | |
|---|---|---|---|
| 3,537,647 | 11/1970 | Camboulives et al. | 239/265.33 |
| 3,612,400 | 10/1971 | Johnson et al. | 239/265.19 |
| 4,361,281 | 11/1982 | Nash | 239/265.37 |
| 4,552,309 | 11/1985 | Szuminski et al. | 239/265.19 |
| 4,799,623 | 1/1989 | Bruchez, Jr. et al. | 239/265.41 |

Primary Examiner—Andres Kashnikow
Assistant Examiner—Karen B. Merritt
Attorney, Agent, or Firm—Edward L. Kochey, Jr.

[57] ABSTRACT

Misalignment tolerances in a nozzle four bar linkage (14, 18, 24, 26) are minimized by direct pinning (42) the A-frame 14 and the mode strut bracket (32). The A-frame and bracket are independently bolted to support 12. Tolerance stackup preventing installation or increasing wear is avoided.

1 Claim, 2 Drawing Sheets

CONVERGENT/DIVERGENT NOZZLE CONSTRUCTION

The Government has rights in this invention pursuant to a contract awarded by the Department of the Air Force.

TECHNICAL FIELD

The invention relates to adjustable nozzles and in particular to a linkage having decreased sensitivity to fabrication tolerances.

BACKGROUND OF THE INVENTION

Gas turbine engines used in aircraft include exhaust nozzles to eject gas and achieve thrust. Increased efficiency is achieved with variable area convergent/divergent nozzles. This is especially true where the engine also uses afterburning.

Each nozzle is formed of a plurality of circumferentially located adjustable sections. Each section includes a four-bar linkage with an A-frame supporting a pivot point. A convergent section is pivotally secured to the A-frame. A divergent flap is secured to the convergent flap and an external flap connected to the divergent flap. Each of these connections are made at two transversely spaced locations. There also is a mode strut connecting the divergent flap and including some lost motion travel.

Conventionally the A-frame is secured to the structural support and a mode strut bracket is also secured to the structural support. The external flap and the mode strut are secured to this mode strut bracket.

In this structure a plurality of tolerances are encountered. The sum of tolerances is accumulated from the structure to the A-frame, the A-frame to the convergent flap, the convergent flap to the divergent flap, the divergent flap to the external flap, the external flap to the mode strut bracket, and the mode strut bracket to the structural support. Since the tolerance deviation at one of the transversely spaced connections may be different from that at the other location, the accumulation of tolerances can end up with the external flap being angularly displaced. This can theoretically be an amount which would prevent installation of this flap. Even where the tolerances are not so extreme, it could require forcing of the connection. Any misalignment increases the wear during operation of the gas turbine nozzle.

SUMMARY OF THE INVENTION

A closely toleranced pin directly spaces and locates the A-frame and the mode strut bracket. Both of these are bolted to the structural frame through loosely toleranced holes. This removes the misalignment tolerance between the structural frame and the A-frame plus the tolerance between the structural frame and the mode strut bracket from the tolerance loop. The misalignment is thereby minimized.

For each section of the nozzle a convergent flap is pivotally mounted to one corner of the A-frame. The divergent flap is pivotally mounted to the convergent flap and also to one end of the external flap. This external flap in turn is pivotally mounted to a mode strut support bracket. Closely toleranced pins and holes locate the mode strut bracket precisely with respect to the A-frame. Both the A-frame and the mode strut bracket are bolted to the structural frame with loosely toleranced bolt holes.

The mode strut itself is also located through a slot in the mode strut bracket.

DESCRIPTION OF THE PREFERRED EMBODIMENT

Figure 4:
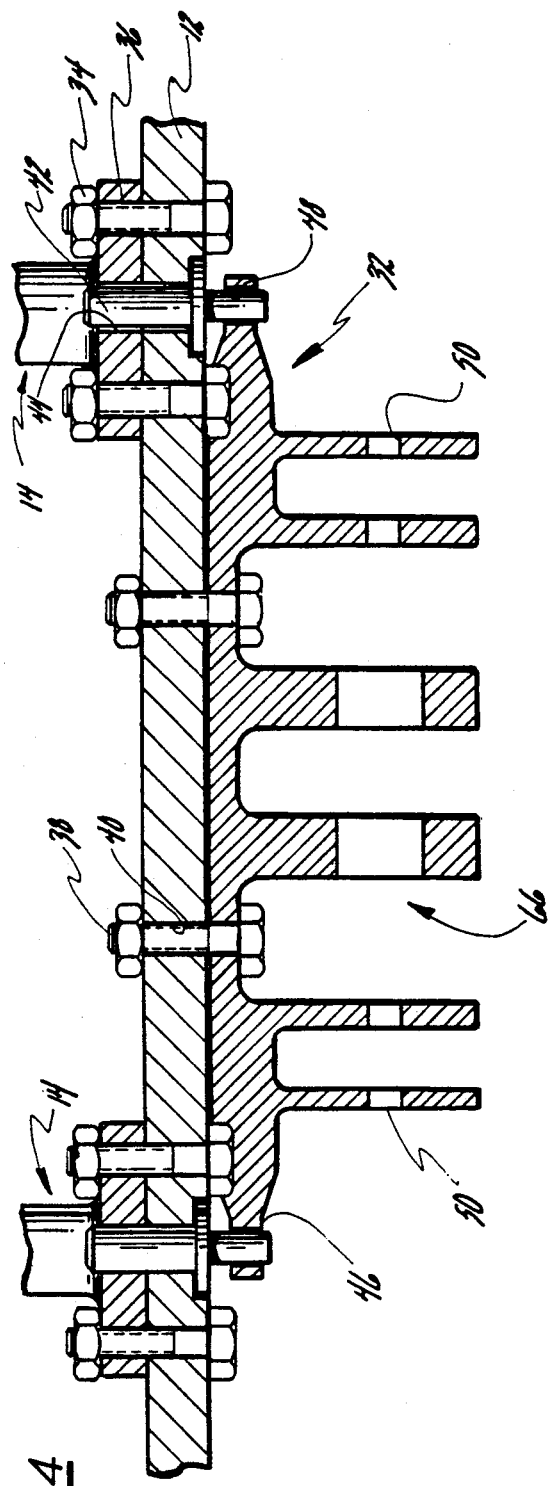
FIG. 4 is a section taken through 4—4 of FIG. 3.

A plurality of convergent/divergent nozzle sections 10 are circumferentially located to form the exhaust nozzle of a gas turbine engine. Each of these portions is secured to static support structure 12 of the nozzle. Two A-frames 14 are secured to the static support structure. Pivot point 16 in each carries convergent nozzle flap 18 which includes liner 20. Pivotally connected to the convergent flap 18 at transversely spaced pivots 22 is the divergent flap 24.

An external flap 26 is pivotally connected at pivots 28 which are transversely spaced and connect the external flap 26 to divergent flap 24. Transversely spaced pivots 30 secure the external flap 26 to a mode strut bracket 32.

This mode strut bracket 32 is also bolted to support structure 12.

Figure 3:
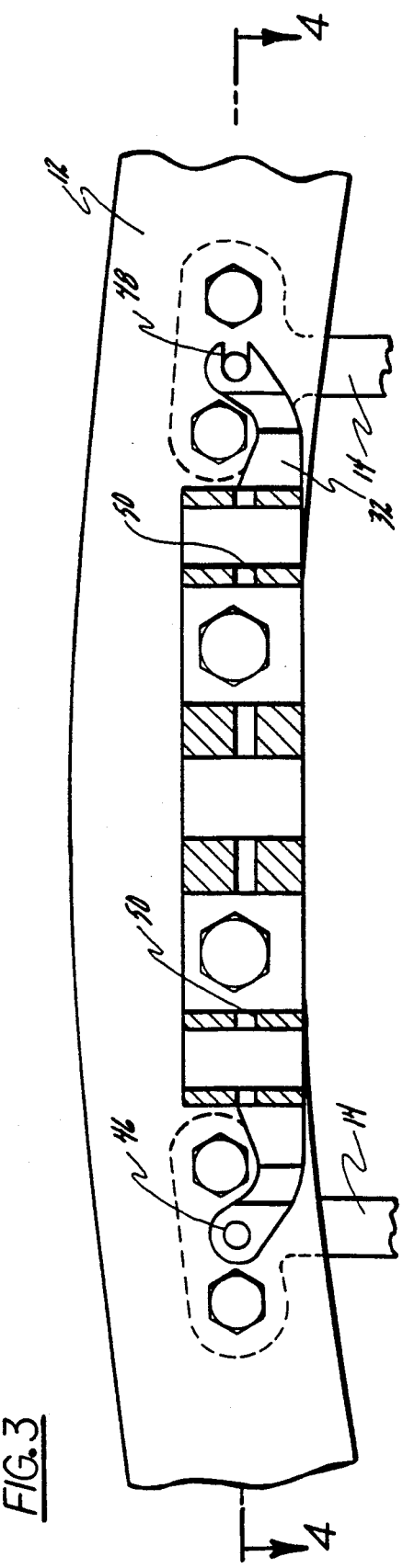
FIG. 3 is a detail of the mode strut bracket.

Referring to FIGS. 3 and 4, the bolted attachment between the A-frame 14 and the support structure 12 is accomplished by loosely toleranced bolts 34 and bolt holes 36. Similarly the mode strut bracket 32 is secured to the support structure by loosely toleranced bolts 38 and bolt holes 40. Precise alignment between the A-frame 14 and the mode strut bracket 32 is accomplished with closely toleranced pins 42 fitting within opening 44 of the A-frame and opening 46 and 48 of the mode strut bracket.

Openings 50 are those to which the external flap 26 is attached.

Figure 1:
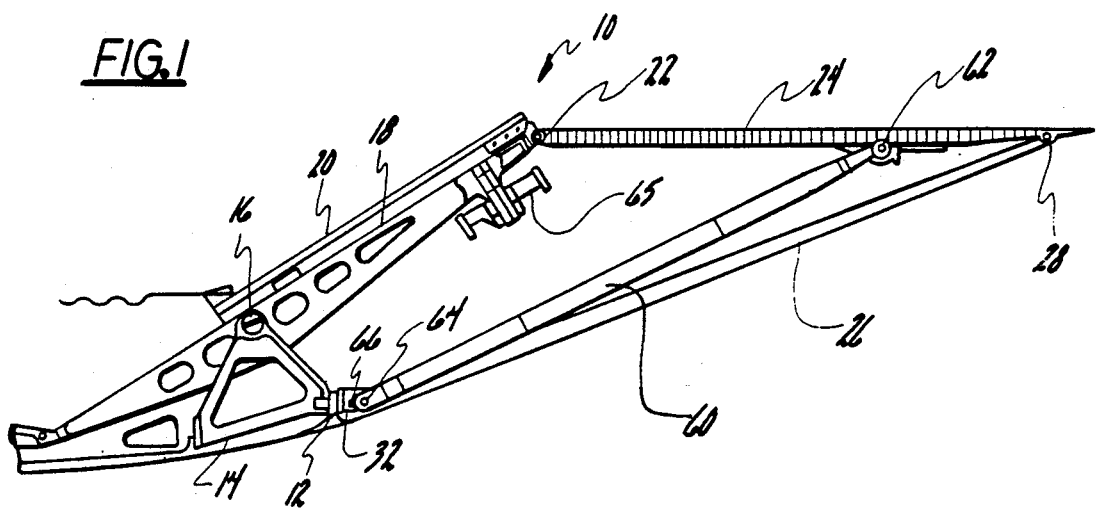
FIG. 1 is a section through the nozzle flaps showing the mode strut arrangement.
Figure 2:
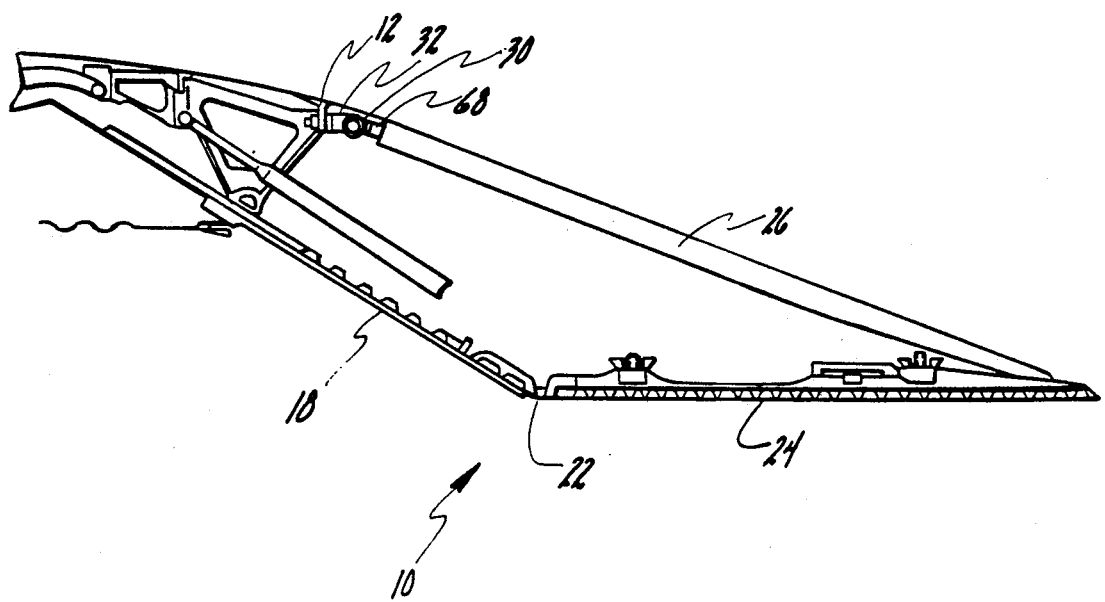
FIG. 2 is a section through the nozzle flaps showing the outside flap arrangement.

Referring back to FIG. 1, mode strut 60 is secured to the divergent flap 24 at pin connection 62. The other end of the mode strut 60 is pinned through pin 64 in slot 66 of the mode strut bracket.

Linkage 65 is operable to change the circumference of the nozzle structure and thereby vary the amount of convergence and divergence of the nozzle. The mode strut 60 determines the location of the relevant nozzle portions with some lost action because of slot 66 in the mode strut bracket. The pressures operating on the flaps determines just where pin 64 will be located in slot 66 at any particular time. The telescopic section 68 of the external flap 26 permits appropriate telescoping to define the overall structure.

The close clearance and tight tolerance around pins 42 firmly establishes the spatial relationship of the A-frame and the mode strut bracket. Accordingly, the tolerances in connecting each to the support structure 12 are out of the cumulative tolerance loop of interest. The relatively loose tolerance connections between the support structure and the A-frame as well as the mode strut bracket, permit adaptation of these components to the tight tolerance location.

Study has shown that with the prior art structure with each of the A-frame and mode strut brackets bolted independently to the support frame the potential angular misalignment was 2½ degrees when the external flap was to be installed. The improvement of pinning the A-frame and the mode strut bracket together has reduced this potential misalignment to less than 1 degree.

We claim:

1. A convergent/divergent nozzle construction for an engine having a support frame for supporting a plurality of annularly spaced flap portions, each portion comprising:

a pair of A-frames;

a convergent flap pivotally mounted at one corner of each A-frame;

a divergent flap pivotally mounted to said convergent flap at two transversely spaced locations;

a mode strut bracket having a mode strut slot;

a mode strut pivotally mounted to said divergent flap and pivotally mounted in said mode strut slot;

an external flap pivotally connected to said divergent flap at two transversely spaced locations and pivotally mounted to said mode strut bracket at two transversely spaced locations;

said A-frames pinned to said mode strut bracket at a plurality of locations with tight tolerance pins and openings; and said A-frame and said mode strut bracket each bolted to said support structure with bolts and loosely toleranced bolt holes.

* * * * *